UNITED STATES PATENT OFFICE.

FRITZ RASCHIG, OF LUDWIGSHAFEN, GERMANY.

PROCESS OF SEPARATING CRESOLS.

SPECIFICATION forming part of Letters Patent No. 656,263, dated August 21, 1900.

Application filed March 3, 1900. Serial No. 7,230. (No specimens.)

*To all whom it may concern:*

Be it known that I, FRITZ RASCHIG, a subject of the German Emperor, residing at Ludwigshafen-on-the-Rhine, in the Kingdom of Bavaria, Germany, have invented a certain new and useful Process of Separating Metacresol from Paracresol, of which the following is a clear and exact specification.

Coal-tar, and consequently also the commercial cresol obtained from the same, contains the three isomeric varieties of cresol—viz., ortho-, meta-, and paracresol. From this mixture of cresols the ortho cresol, which distils at 180° centigrade, may be separated by fractional distillation, so as to leave a mixture consisting of about sixty per cent. of metacresol and 40 per cent. of paracresol. Both cresols boil at 200° and cannot be separated from each other by fractional distillation. Their separation is, however, very desirable from a commercial point of view, because, for instance, the trinitro cresol recently used as a substitute for picric acid is exclusively a derivative of the meta-cresol. In nitrating the mixture containing the three isomers or the mixture of meta- and paracresol left after the removal of the ortho cresol only the metacresol is nitrated, while the ortho cresol and the paracresol are completely oxidized, thereby increasing the consumption of nitric acid, and consequently the cost of production of the trinitro-metacresol.

A process for separating the metacresol from the paracresol has been described in my application for patent, Serial No. 732,552, filed on the 4th of October, 1899. It is based on the fact that the two sulfo-acids, which can be produced from the mixture of cresols by treatment with sulfuric acid, are not equally soluble in an excess of sulfuric acid, the meta-cresol sulfonic acid being easily soluble in the same, while the para-cresol sulfonic acid, as well as its sodium salt, is either not soluble at all or only with great difficulty. The said process therefore consists in sulfonating the mixture of cresols, so as to obtain a mixture of sulfo-acids, allowing the latter to stand with the excess of sulfuric acid until the para-cresol sulfonic acid has crystallized out and, finally, separating the solid para-acid thus obtained from the meta-acid, which has remained liquid.

The new process for separating the metacresol from the paracresol is based on the fact that the sulfo-acids obtained by sulfonating the mixture of both cresols behave differently when treated with superheated steam—that is to say, they are split up into cresol and sulfuric acid at different temperatures. The metacresol-sulfonic acid splits already at a temperature between 120° and 130° centigrade, while the paracresol sulfonic acid remains intact at this temperature and is only decomposed at about 140° to 160° by giving off paracresol.

In carrying out this process the commercial mixture of metacresol and paracresol, which contains about sixty per cent. of the former and about forty per cent. of the latter, is treated with concentrated or fuming sulfuric acid, preferably by dissolving one hundred kilos of the cresol mixture in about four hundred kilos of concentrated or about three hundred kilos of fuming sulfuric acid containing twenty per cent. of $SO_3$. If concentrated acid is used, I heat to 100° for about an hour; but if fuming acid is used for sulfurizing the reaction causes considerable increase of heat without requiring any external heating. The ratios between the quantity of cresol mixture and that of acid may differ from those stated above; but the latter have been found specially suitable. The mixture resulting from the reaction is now treated with superheated steam at a temperature ranging between (approximately) 120° and 130° centigrade, care being taken that the latter temperature will not be much exceeded. This limit of temperature may be regulated or maintained in a simple manner by adding to the product of the reaction so much water that the boiling-point of the mixture will be between 125° and 130° centigrade. When steam is admitted, the decomposition of the metacresol-sulfonic acid takes place smoothly as soon as the said temperature has been reached, the result being sulfuric acid and metacresol, which distils off, while the paracresol-sulfuric acid remains behind undecomposed. After the metacresol has been distilled off the paracresol-sulfonic acid may also be split up by superheated steam, but at a higher temperature.

What I claim is—

1. The process for separating metacresol from paracresol, which consists in sulfonating a mixture of the two cresols and treating the mixture of sulfo-acids thus obtained with steam at a temperature which causes the decomposition of the metacresol-sulfonic acid, but leaves the paracresol-sulfonic acid intact, substantially as described.

2. The process for separating metacresol-sulfonic acid from paracresol-sulfonic acid, which consists in subjecting a mixture of the same to steam at a temperature sufficient to decompose the metacresol-sulfonic acid, substantially as described.

3. The process for separating metacresol from a mixture of metacresol-sulfonic acid and paracresol-sulfonic acid, which consists in subjecting the said mixture to superheated steam at a temperature ranging approximately between 120° and 130° centigrade, thereby splitting up the metacresol-sulfonic acid into metacresol which distils off, and sulfuric acid which remains with the undecomposed meta-cresol sulfonic acid, but not sufficient to decompose the paracresol-sulfonic acid, substantially as described.

In witness whereof I have hereunto set my hand in the presence of two subscribing witnesses.

FRITZ RASCHIG.

Witnesses:
HERMANN MEINHARDT,
FR. JOSEF DÖRFEL.